2 Sheets—Sheet 1.

C. GORMANN.
VEHICLE FIFTH WHEEL.

No. 174,804.   Patented March 14, 1876.

Witnesses.
E. F. Kastenhuber
Otto Hufland

Inventor.
Christian Gormann
per
Van Santvoord & Hauff
Attrs

C. GORMANN.
VEHICLE FIFTH WHEEL.

No. 174,804. Patented March 14, 1876.

2 Sheets—Sheet 2.

Witnesses.
E. F. Kastenhuber
Otto Hufeland

Inventor.
Christian Gormann
p.
Van Santvoord & Hauff
Attys

UNITED STATES PATENT OFFICE.

CHRISTIAN GORMANN, OF UNION HILL, NEW JERSEY.

IMPROVEMENT IN VEHICLE FIFTH-WHEELS.

Specification forming part of Letters Patent No. 174,804, dated March 14, 1876; application filed September 9, 1875.

*To all whom it may concern:*

Be it known that I, CHRISTIAN GORMANN, of Union Hill, in the county of Hudson and State of New Jersey, have invented a new and useful Improvement in Fifth-Wheels for Vehicles, which improvement is fully set forth in the following specification, reference being had to the accompanying drawing, in which—

Figure 1:
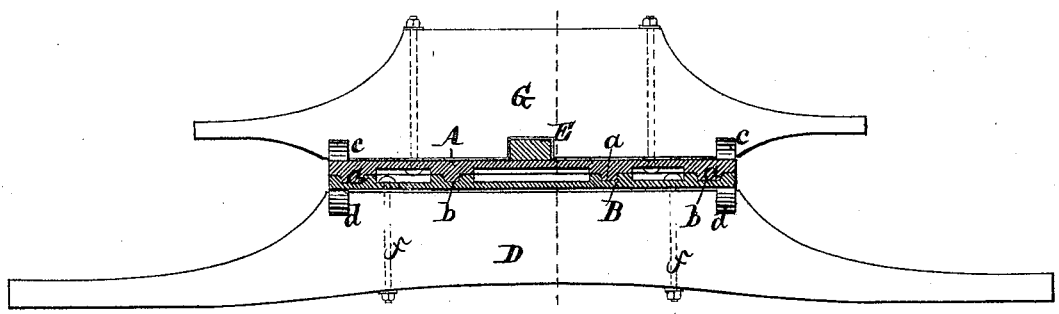
Figure 2:
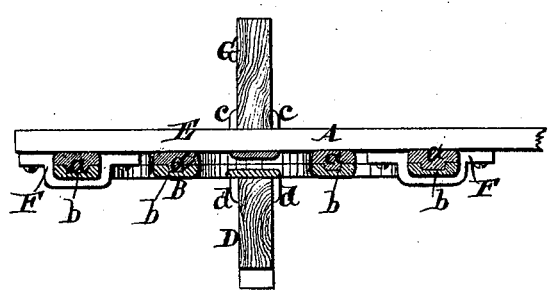
Figure 3:
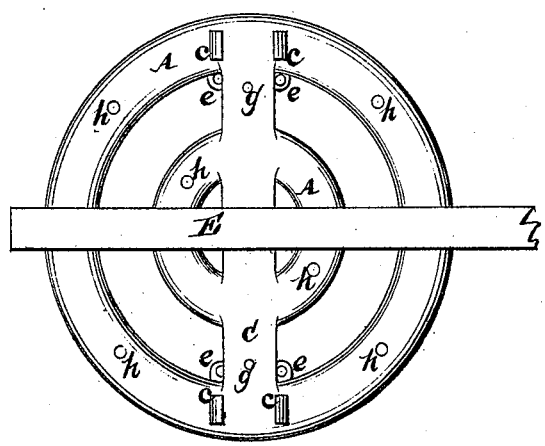
Figure 4:
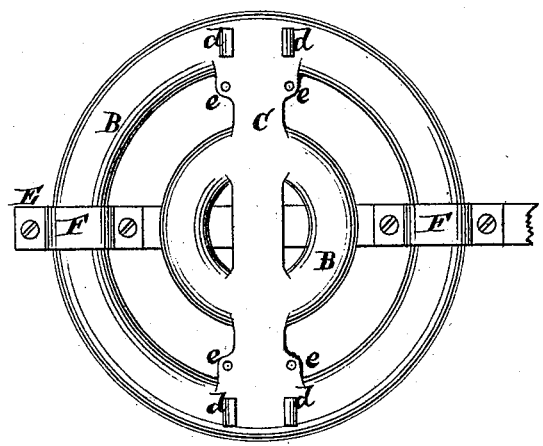
Figure 5:
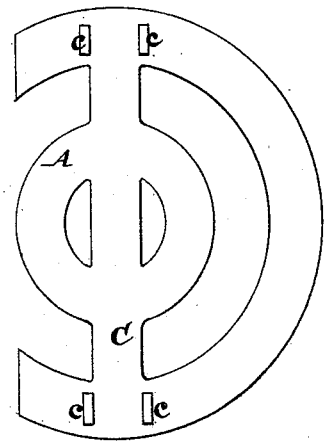

Figure 1 represents a cross-section of my improvement, showing the manner of applying it to the bed and fore-axle of a vehicle. Fig. 2 is a longitudinal section of the same. Fig. 3 is a plan view. Fig. 4 is an inverted plan view on a reduced scale. Fig. 5 shows a modification.

Similar letters indicate corresponding parts.

My invention relates to certain improvements in fifth-wheels for vehicles, and is made with a view, mainly, to dispense with a king-bolt, whereby I obviate, among other things, the making of a hole through the fore axle to accommodate such bolt, and thus preserve the inherent strength of the axle.

My improvement consists in constructing fifth-wheels of an upper and lower section, the bearing-surfaces of which are provided, respectively, with concentric grooves and corresponding flanges, which are fitted together in such a manner that the sections are guided when rotated on each other, and a center or king bolt may be dispensed with. The sections have lugs formed on their outer surfaces in pairs and opposite each other, for receiving between them the bed or bolster and the fore axle of a vehicle; and thus the relative positions of such parts may be readily determined. The lower section, moreover, which is fastened to the axle, is provided with perforated ears, whereby the said section is adapted to be fastened by means of bolts passing alongside the axle, and by this arrangement the axle remains solid.

In the drawing, the letter A designates the upper, and B the lower, section of fifth-wheel, each of which is a counterpart of the other, having the form of double rings, and of a cross-piece, C, as shown, in order to increase their effective area. The upper section A has flanges $a$, while the lower section B has grooves $b$, which flanges and grooves are made on the inner or bearing surfaces of the sections and at the point of the double rings, in case such rings form a part of the sections. The flanges $a$ and grooves $b$ are concentric with each other and with the sections A B, and are fitted together, so that when the sections are placed on each other the flanges enter the grooves, and by this means the sections are guided when rotated on each other in steering by the axle D of a vehicle, to which the whole may be applied; but it is obvious that while the flanges and grooves permit of the rotation of the sections they prevent endwise motion thereof or motion in the line of draft of the vehicle. The sections A B, when put together and applied to a vehicle, are connected to the perch E by means of straps F, which are fitted round and across the outer ring of the sections, as shown in Figs. 2 and 4; and these straps F, moreover, serve to hold the sections A B against being lifted off from each other. At or near the edge of the sections A B, and on the outer surfaces thereof, are cast or otherwise formed lugs $c\ c\ d\ d$, which are arranged in pairs and are situated diametrically opposite each other in the plane of the cross-piece C. The lugs $c\ c$ of the upper section receive between them the bed or bolster G of a vehicle while the lugs $d\ d$ receive between them the fore axle D, and by this arrangement the bolster and the axle are readily got in a straight line parallel with each other, and across the axis of the wheel. At the point of the cross-piece of the lower section B are formed projecting ears $e\ e$ (best seen in Fig. 4) which are pierced, as shown, and are situated opposite to each other. The lower section B forms the part which is fastened to the axle D, and through the medium of the pierced projections $e\ e$ bolts $f\ f$ may be passed along the sides of the axle instead of through the same for the purpose of fastening the section, as indicated in dotted outlines in Fig. 1, and by this means the solidity of the axle is preserved. The upper section A is fastened to the bolster G by means of bolts passing through the latter, the cross-piece C of the upper section having holes $g$ formed in it for the passage of the bolts. In order to permit of passing a lubricant to the grooves $b$ oil-holes $h$ are formed in the upper section A at suitable points, as shown in Fig. 3—that is to say, at the points of and through the flanges $a$.

It is obvious that my invention is applicable to fifth-wheels in an entire or a segmental form, and in Fig. 5 I have indicated a method of constructing a segment, part of the outer ring of the sections A B being cut away. This form of wheel is intended for light carriages.

What I claim as new, and desire to secure by Letters Patent, is—

The fifth-wheel for a wagon constructed of the sections A B, which have, respectively, concentric flanges $a$ and corresponding grooves and lugs $c\ c$ and $d\ d$ formed in pairs and opposite each other, substantially as described.

In testimony that I claim the foregoing I have hereunto set my hand and seal this 27th day of August, 1875.

CHRISTIAN GORMANN. [L. S.]

Witnesses:
CHAS. WAHLERS,
ROBT. E. MILLAR.